US010187386B2

(12) United States Patent
Murthy et al.

(10) Patent No.: US 10,187,386 B2
(45) Date of Patent: Jan. 22, 2019

(54) NATIVE ENROLLMENT OF MOBILE DEVICES (71) Applicant: AirWatch LLC, Atlanta, GA (US)

(72) Inventors: Varun Murthy, Atlanta, GA (US); Kalyan Regula, Alpharetta, GA (US); Shravan Shantharam, Cumming, GA (US); Jason Roszak, Brookhaven, GA (US)

(73) Assignee: AIRWATCH LLC, Atlanta, GA (US)

( * ) Notice: Subject to any disclaimer, the term of this patent is extended or adjusted under 35 U.S.C. 154(b) by 175 days.

(21) Appl. No.: 14/923,826

(22) Filed: Oct. 27, 2015

(65) Prior Publication Data

US 2017/0118211 A1   Apr. 27, 2017

(51) Int. Cl.
G06F 8/61 (2018.01)
G06F 21/60 (2013.01)
H04L 29/06 (2006.01)
H04W 12/06 (2009.01)

(52) U.S. Cl.
CPC ............ *H04L 63/0876* (2013.01); *G06F 8/61* (2013.01); *G06F 8/62* (2013.01); *G06F 21/604* (2013.01); *H04W 12/06* (2013.01)

(58) Field of Classification Search
CPC ....... H04L 63/0876; G06F 8/61; G06F 21/604
USPC .......................................................... 726/6
See application file for complete search history.

(56) References Cited

U.S. PATENT DOCUMENTS

| 8,572,684 | B1* | 10/2013 | Sama | H04L 9/3228 |
| | | | | 726/2 |
| 2014/0040973 | A1* | 2/2014 | Bhat | G06F 21/10 |
| | | | | 726/1 |
| 2015/0172261 | A1* | 6/2015 | Counterman | H04L 63/0815 |
| | | | | 726/7 |
| 2015/0254441 | A1* | 9/2015 | Sanso | G06F 21/41 |
| | | | | 726/9 |
| 2017/0094509 | A1* | 3/2017 | Mistry | H04L 63/083 |

* cited by examiner

*Primary Examiner* — Eleni A Shiferaw
*Assistant Examiner* — Angela R Holmes
(74) *Attorney, Agent, or Firm* — Thomas Horstemeyer, LLP (57) ABSTRACT Disclosed are approaches for native enrollment of mobile devices. A first message is received from a client device, wherein the first message comprises an enrollment request for the client device. An application is sent to the client device, wherein the application is to be installed on the client device. A second message is received from the client device, wherein the second message comprises an authentication request from the client device. Authentication credentials are then provided to the installed application. A third message is received from the client device, wherein the third message comprises an enrollment confirmation for the client device. The enrollment status of the client device is then changed. Finally, a policy is sent to the installed application.

20 Claims, 9 Drawing Sheets

NATIVE ENROLLMENT OF MOBILE DEVICES

BACKGROUND

Companies are increasingly allowing employees and contractors to bring their own devices to work and access corporate data, email, and other information. Information technology departments need ways to manage these personal devices to ensure their security. Some operating system or device manufacturers have therefore started offering native device management software that provides basic functionality like the ability to remotely wipe corporate data from a personal device.

For many organizations, the basic functionality offered by native device management software does not adequately address their concerns. As a result, companies can require that employees install enhanced mobile device management software that provides more advanced configuration and protection.

For devices that already include native management and should also use enhanced management software, an issue arises with being able to detect whether the enhanced management software has been uninstalled. The device may not report an uninstall event to a server because the native agent locally stores whether it is enrolled. There is therefore a need to ensure that enhanced management software is active, and also to prevent a user from making any changes to the configuration settings of the enhanced management software. For example, a user can uninstall the software or delete a database stored on the device that indicates the device is enrolled with management software. The user can then bypass securities offered by the enhanced software by disabling firewall protections, turning off automatic software updates, and disabling other features designed to keep the device secure using the enhanced management software.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples for providing native enrollment of devices with a management service. A client device can be enrolled with a device management service. As part of the enrollment process, the management service can require that the client device install an additional application that monitors the configuration of the client device. This additional application can ensure that changes to the configuration of the client device are reversed or otherwise prevented. To expedite enrollment, a uniform process that minimizes the amount of information that a user must provide to the management service can be employed.

Figure 1:
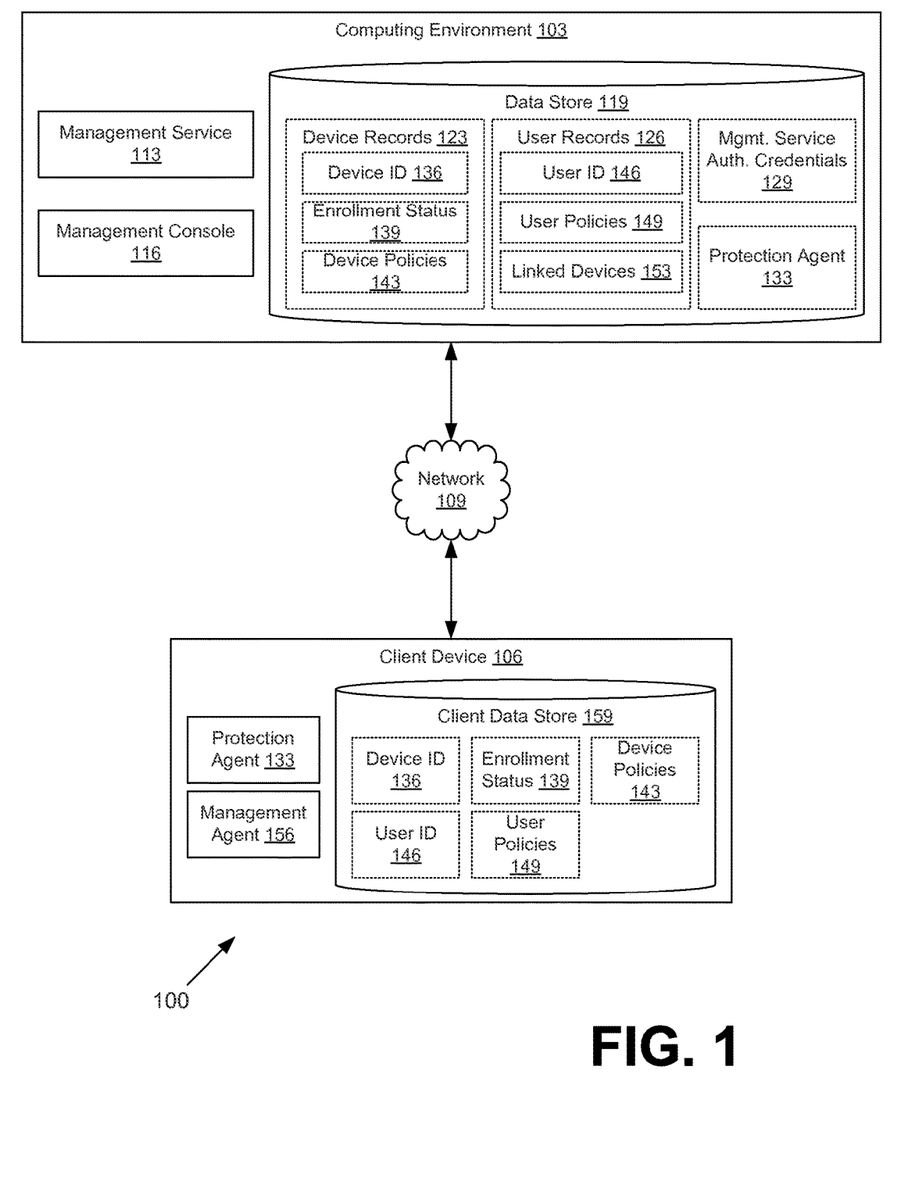
FIG. 1 is a schematic block diagram of a networked environment.

With reference to FIG. 1, shown is a networked environment 100 according to some examples. The networked environment 100 includes a computing environment 103, a client device 106, and potentially other devices, which are in data communication with each other over a network 109. The network 109 includes, for example, the Internet, intranets, extranets, wide area networks (WANs), local area networks (LANs), wired networks, wireless networks, or other suitable networks, or any combination of two or more networks. For example, the networks can include satellite networks, cable networks, Ethernet networks, and other types of networks.

The computing environment 103 can include, for example, a server computer or any other system providing computing capability. Alternatively, the computing environment 103 can employ a plurality of computing devices that can be arranged, for example, in one or more server banks, computer banks, or other arrangements. The computing devices can be located in a single installation or can be distributed among many different geographical locations. For example, the computing environment 103 can include a plurality of computing devices that together can comprise a hosted computing resource, a grid computing resource, or any other distributed computing arrangement. In some cases, the computing environment 103 can correspond to an elastic computing resource where the allotted capacity of processing, network, storage, or other computing-related resources can vary over time.

The components executed on the computing environment 103 can include a management service 113, a management console 116, and other applications or functionality. The management service 113 can administer the operation of client devices 106 registered or otherwise enrolled with the management service 113. To this end, the management service 113 can enforce or otherwise require particular applications to be installed on an enrolled client device 106, require the client device 106 to be configured in a particular manner, or require that particular features be enabled or disabled on the client device 106, as further described below. The management console 116 can provide an administrative interface for configuring the operation of the management service 113 and the configuration of client devices 106 that are administered by the management service 113. Accordingly, the management console 116 can correspond to a web page or web application provided by a web server hosted in the computing environment 103.

The data store 119 can be representative of a plurality of data stores 113. The data stored in the data store 119 can include, for example, one or more device records 123, one or more user records 126, one or more management service authentication credentials 129, a copy of the protection agent 133, and potentially other data.

Device records 123 represent information about client devices 106 that have been or are currently administered by the management service 113. For example, each client device 106 administered by the management service 113 can have at least one corresponding device record 123. A device record 123 can include a device identifier 136 for the corresponding client device 106, an enrollment status 139, and one or more applicable device policies 143.

A device identifier 136 can represent a unique identifier for the client device 106. For example, a device identifier 136 can include a serial number of the client device 106, a media access control (MAC) address of a network interface of the client device 106, a device fingerprint, or other identifier that can serve to uniquely identify the client device 106. In some instances, a device identifier 136 can include a combination of individual identifiers, such as a combination of a MAC address and a serial number.

The enrollment status 139 can represent the current status of the client device 106 with respect to the management service 113, such as "enrolled," "unenrolled," "pending," or similar enrollment statuses that reflect whether or to what extent a client device 106 is enrolled with the management service 113.

The device policies 143 represent one or more policies that are to be enforced for the client device 106 associated with the device record 123. Device policies 143 can include settings, permissions, or other configuration options that can be enforced when a client device 106 operates. For example, a device policy 143 can specify that a client device 106 have specific client applications installed or specific versions of client applications installed. A device policy 143 can further specify that the installed applications be configured in a particular manner or that certain settings for the installed applications be set to specified values. For example, a device policy 143 could require that an email client use encryption when connecting to a corporate server. In some instances, a device policy 143 could require that a virtual private network (VPN) client have particular encryption algorithms enabled or disabled. A device policy 143 can also specify that particular device or operating system features be enabled or disabled. For example, the device policy 143 could specify that a client device 106 with MICROSOFT WINDOWS installed have BitLocker® drive encryption enabled. As another example, the device policy 143 could specify that a firewall integrated with the operating system of the client device 106 be enabled. In some instances, a device policy 143 can specify particular configuration settings, such as email account settings, network proxy settings, and other settings. For example, a device policy 143 could specify that a web browser send all traffic through a particular proxy server. As another example, a device policy 143 can specify that the client device 106 can only access certain content at certain times, while the client device 106 is in certain locations, or while the client device 106 is connected to particular networks 109. In some instances, a device policy 143 can also specify that certain cryptographic certificates be installed on the client device 106 as encryption certificates for secure communications, signing certificates to authenticate messages or applications sent to or received from the management service 113, as well as other certificates. In various instances, a device policy 143 could also specify that a password or passcode have a minimum length or be of a minimum complexity.

User records 126 represent information regarding individual users or owners of client devices 106. A user record 126 can include a user identifier 146 to uniquely identify a user, such as an account name and password, an email address, a phone number, or similar unique identifier. A user record 126 can also include one or more user policies 149 as well as a set of linked devices 153. User policies 149 represent one or more policies that are to be enforced for the client devices listed in the linked devices 153. For example, user policies 149 can be applied to a client device to which a user is currently logged to enforce settings, permissions, or configuration options for the user. The list of linked devices 153 includes device records 123 of client devices 106 associated with a particular user. The client devices 106 can include client devices 106 registered or enrolled by the user, client devices 106 owned by the user, as well as client devices 106 currently in use by the user.

Management service authentication credentials 129 include one or more credentials used by the management service 113 to authenticate transactions between the management service 113 and applications, such as the protection agent 133 or the management agent 156, executing on the client device 106. The management service authentication credentials 129 can include one-time authorization (OTA) codes or tokens generated by the management service 113, hash-based message authentication codes (HMAC) generated by the management service 113, or similar knowledge-based authentications credentials.

A copy of the protection agent 133 can also be stored in the data store 119. The protection agent 133 can be sent to the client device 106 to be installed, as further described below. The protection agent 133 can be executed by the client device 106 to prevent unauthorized changes to settings or configuration details governed by applicable device policies 143 or user policies 143, as further described below.

The client device 106 can represent one or more client devices 106 that can be coupled to the network 109. The client device 106 can correspond to a desktop computer, a laptop computer, personal digital assistants, cellular telephones, smartphones, set-top boxes, music players, web pads, tablet computer systems, game consoles, electronic book readers, or other devices with like capability. The client device 106 can be configured to execute applications, such as the protection agent 133, the management agent 156, or other applications.

The protection agent 133 can be executed in a client device 106 to prevent a user from, for example, modifying device policies 143, user policies 149, or otherwise interfering with the operation of the management agent 156. The protection agent 133 can periodically compare the device policies 143 or the user policies 149 downloaded to the client device 106 with copies stored in the computing environment 103 or elsewhere to determine whether the policies have been locally modified. Similarly, the protection agent 133 can periodically compare one or more settings of the client device 106 with secured copies of the device policies 143 or user policies 146 to see if a user has changed a setting in a manner that violates a policy. As another example, the protection agent 133 can detect whether a user account on the client device 106 corresponding to the user identifier 146 has been deleted from the client device 106. In response, the protection agent 133 can remove from the client data store 159 the device policies 143, user policies 149, and any data governed by the device policies 143 or user policies 149. The protection agent 133 can also initiate removal of the protection agent 133 itself, the management agent 156, and potentially other applications installed on the client device 106.

The management agent 156 can enforce the device policies 143 or the user policies 149 specified for the client device 106. As an example, the management agent 156 can change settings to conform to those specified in the policies. Moreover, the client device 106 can include a client data store 159 to cache or otherwise locally store the device identifier 136, enrollment status 139, device policies 143, user identifier 146, and the user policies 149. The client device 106 can be configured to execute applications beyond the protection agent 133 and the management agent 156, such as email applications, social networking applications, word processors, spreadsheets, or other applications.

Next, a general description of the operation of the components of the networked environment 100 is provided. To begin, an administrator can use the management console 116 to enable use of the protection agent 133 with the management agent 156 on client devices 106. In some instances, the administrator can enable use of the protection agent 133 for specific client devices 106 or classes of client devices 106 enrolled with the management service 113. In other instances, the protection agent 133 can be enabled for all client devices 106 enrolled with the management service 113.

Subsequently, a user installs the management agent 156 on the client device 106 and then attempts to enroll his or her client device 106 for use with the management service 113, as further described below. As part of the enrollment process, users can provide information about themselves, such as email addresses, user names, passwords, and other information, as well as information about the client device 106 being enrolled, such as the type of device, the owner of the device, and similar information. A corresponding device record 123 can then be created for the client device 106 and, in some instances, default device policies 143 can be added to the device record 123.

After enrollment, the management agent 156 attempts to check-in with the management service 113. The management service 113 determines, as part of the check-in process, whether the client device 106 is required to have the protection agent 133 installed and running. If the protection agent 133 is required for the client device 106, then the management service 113 sends a copy of the protection agent 133 to the client device 106. The management agent 156 then causes the protection agent 133 to be installed on the client device 106 and begin execution. After sending the protection agent 133 to the client device 106, the management service 113 changes the enrollment status 139 for the client device to "pending" or a similar status.

After the protection agent 133 is installed on the client device 106, the protection agent 133 contacts the management service 113. The management service 113 identifies the client device 106 and changes the enrollment status 139 of the device record 123 for the client device 106 to "enrolled" or a similar status. The management service 113 then sends one or more device policies 143, one or more user policies 149, and potentially other data, to the client device 106. The management agent 156 configures the client device 106 to comply with the policies sent from the management service 113 and the protection agent 133 records which policies have been sent to the client device 106.

Figure 2:
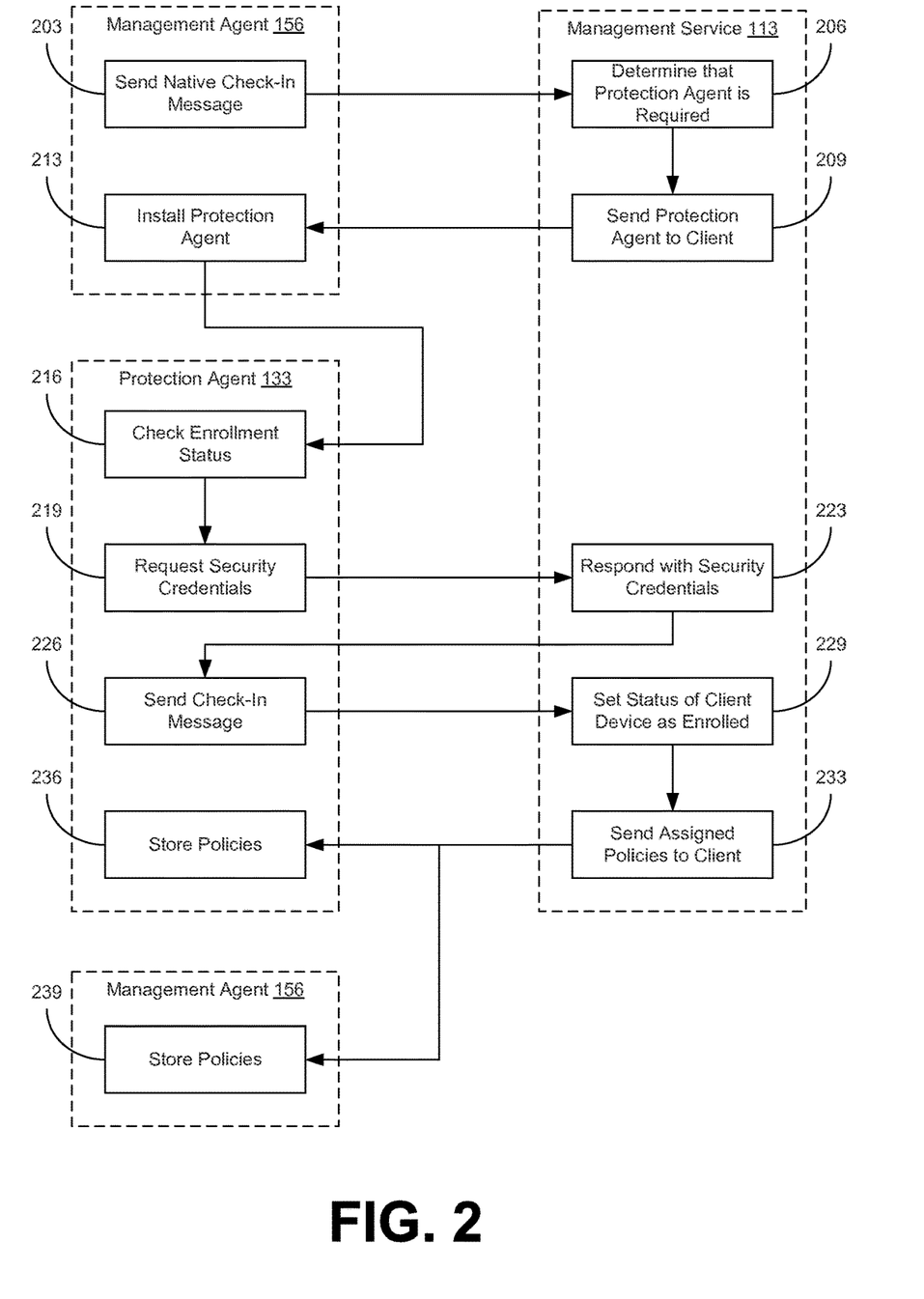
FIG. 2 is a sequence diagram depicting the interaction of various components.

Referring next to FIG. 2, shown is a sequence diagram that provides one example of the operation of portions of the management service 113, the protection agent 133, and the management agent 156. As an alternative, the sequence diagram of FIG. 2 can be viewed as depicting an example of elements of a method implemented in the networked environment of FIG. 1.

Beginning with step 203, the management agent 156 can send a native check-in message. The native check-in message can include an enrollment request indicating that the client device 106 is to be enrolled with the management service 113. The enrollment request can include a device identifier 136, a user identifier 146, user information (e.g. email address, password), device information (e.g. ownership information, device type), and potentially other data collected from the user or the client device 106. Some native or non-native management agents, however, do not send a similar message when a user removes or disables the management agent 156. In these examples, an additional protection agent 133 can be installed to monitor and prevent attempts to remove or modify the management agent 156.

Moving on to step 206, the management service 113 can determine that the protection agent 133 must be installed and executing on the client device 106 before the client device 106 can be registered or enrolled with the management service 113. For example, the management service 113 can check to see if use of the protection agent 133 has been enabled through the management console 116. Normally, the management service 113 can simply respond to the native check-in message. By adding a protection agent 133, the native enrollment process can be dependent on installing the protection agent 133 without modifying the management agent 156.

Proceeding next to step 209, the management service 113 can send a copy of the protection agent 133 to the management agent 156 for installation on the client device 106. In some instances, the management service 113 can also change the enrollment status 139 to "pending" or a similar status after sending the protection agent 133 to the management agent 156 for installation. In some instances, the enrollment status 139 can be provided to the client management agent 156 along with the copy of the protection agent 133. The management service 113 then waits until is contacted by the protection agent 133 after installation.

Referring next to step 213, the management agent 156 can install the copy of the protection agent 133 provided by the management service 113. The management agent 156 then waits for enrollment to be completed.

Moving on to step 216, the protection agent 133 can check the enrollment status 139 of the client device 106. In some instances, the enrollment status 139 can be locally stored on the client device 106. In these instances, the protection agent 133 checks the locally stored enrollment status 139. In other instances, the protection agent 133 can request the enrollment status 139 of the client device 106 from the management service 113. In either instance, if the enrollment status 139 of the client device is "pending," then the protection agent 133 proceeds to step 219.

Proceeding next to step 219, the protection agent 133 can request security credentials from the management service 113, such as the management service authentication credentials 129, in order to verify the identity of the management service 113. This step can be taken by the protection agent 133 to ensure that is communicating with the correct instance of the management service 113.

Referring next to step 223, the management service 113 can respond to the request for security credentials. For example, the management service 113 can provide the management service authentication credentials 129 to the protection agent 133.

Moving on to step 226, the protection agent 133 can send its own check-in message to the management service 113. Similar to the check-in message previously sent by the management agent, the check-in message sent by the protection agent 133 can include a device identifier 136, a user identifier 146, user information (e.g. email address, password), device information (e.g. ownership information, device type), and potentially other data collected from the user or the client device 106.

Proceeding next to step 229, the management service 113 can compare the information provided by the protection agent 133 to the information previously provided in the check-in message sent from the management agent 156. If the appropriate information included in the check-in messages match, then the management service 113 can determine that the protection agent 133 provided to the client device 106 has been installed and that the protection agent 133 is finishing the enrollment process. Accordingly, the management service 113 sets the enrollment status 139 of the client device 106 to "enrolled," "registered," or a similar status.

Referring next to step 233, the management service 113 can send the appropriate device policies 143 and user policies 149 to the client device 106. In some instances, the device policies 143 and user policies 149 can be separately sent to the protection agent 133 and the management agent 156. In other instances, the device policies 143 can be sent to either the protection agent 133, which then provides copies of the device policies 143 and user policies 149 to the management agent 156.

Moving on to step 236, the protection agent 133 can store the received device policies 143 and user policies 149 to the client data store 159. In some instances, the protection agent 133 can encrypt the locally stored device policies 143 and user policies 149 in order to prevent unauthorized modification of the policies.

Similarly at step 239, the management agent 156 can store the received device policies 143 and user policies 149. The management agent 156 can subsequently configure the client device 106 to comply with device policies 143 and user policies 149.

Figure 3:
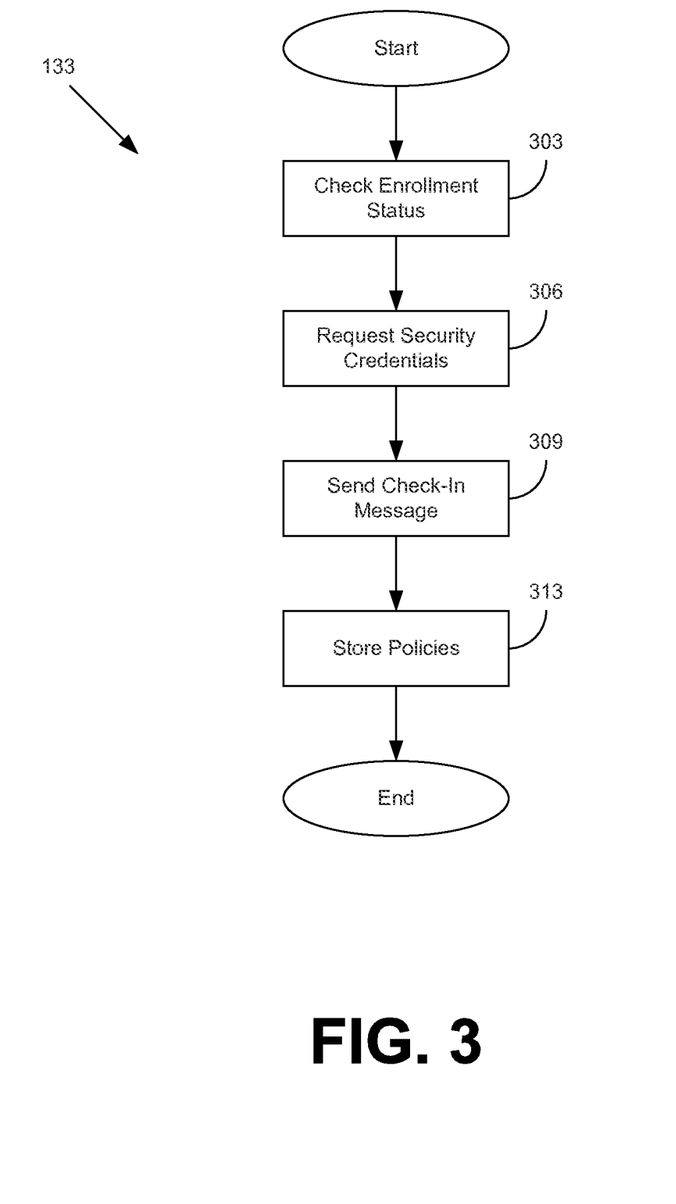
FIG. 3 is a flowchart depicting the operation of an application.

Referring next to FIG. 3, shown is a flowchart that provides one example of the operation of a portion of the protection agent 133. As an alternative, the flowchart of FIG. 3 can be viewed as depicting an example of elements of a method implemented in the networked environment of FIG. 1.

Beginning with step 303, the protection agent 133 can check the enrollment status 139 of the client device 106. In some instances, the enrollment status 139 can be locally stored on the client device 106. In these instances, the protection agent 133 checks the locally stored enrollment status 139. In other instances, the protection agent 133 can request the enrollment status 139 of the client device 106 from the management service 113. In either instance, if the enrollment status 139 of the client device is "pending," then the protection agent 133 proceeds to step 306.

In step 306, the protection agent 133 can request security credentials from the management service 113, such as the management service authentication credentials 129, in order to verify the identity of the management service 113. This step can be taken by the protection agent 133 to ensure that is communicating with the correct instance of the management service 113.

Referring next to step 309, the protection agent 133 can send a check-in message to the management service 113. Similarly to the check-in message previously sent by the management agent, the check-in message sent by the protection agent 133 can include a device identifier 136, a user identifier 146, user information (e.g. email address, password), device information (e.g. ownership information, device type), and potentially other data collected from the user or the client device 106.

Proceeding next to step 313, the protection agent 133 can store the received device policies 143 and user policies 149 to the client data store 159. In some instances, the protection agent 133 can encrypt the locally stored device policies 143 and user policies 149 in order to prevent unauthorized modification of the policies.

Figure 4:
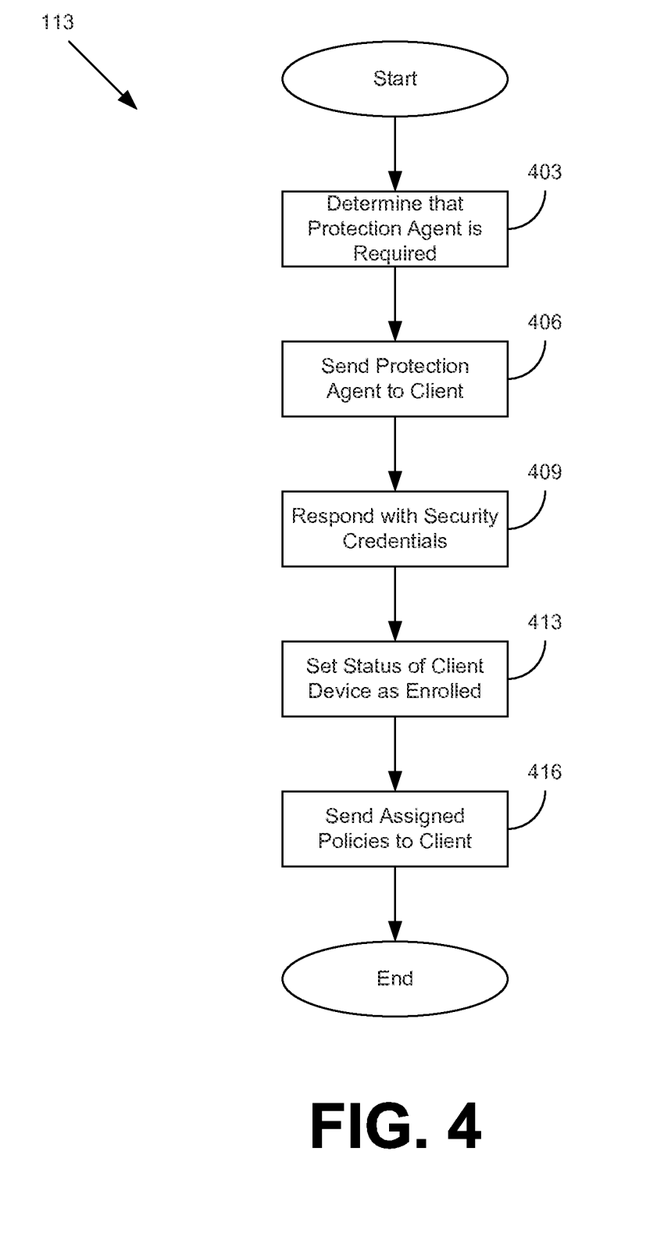
FIG. 4 is a flowchart depicting the operation of an application.

Referring next to FIG. 4, shown is a flowchart that provides one example of the operation of a portion of the management service 113. As an alternative, the flowchart of FIG. 4 can be viewed as depicting an example of elements of a method implemented in the networked environment of FIG. 1.

Beginning with step 403, the management service 113 can determine that the protection agent 133 must be installed and executing on the client device 106 before the client device 106 can be registered or enrolled with the management service 113. For example, the management service 113 can check to see if an administrator has used the management console 116 to select an option mandating that the protection agent 133 be installed prior to enrollment. An administrator can select this option, for example, because some client environments can allow a user to uninstall the management agent 156 without sending a notification to the management service 113. Similarly other client environments can allow a user to locally change the enrollment status 139 of the client device 106 without providing a notification to the management service 113. As an example, client devices 106 executing a 32-bit version of the management agent 156 on version 8.1 of MICROSOFT WINDOWS operating system do not require that a message be sent to the management service 113 when the management agent 156 is locally uninstalled or the enrollment status 139 of the client device 106 is locally changed.

Moving on to step 406, the management service 113 can send a copy of the protection agent 133 to the management agent 156 for installation on the client device 106. In some instances, the management service 113 can also change the enrollment status 139 to "pending" or a similar status after providing the protection agent 133 to the management agent 156 for installation. In other instances, the enrollment status 139 can be provided to the client management agent 156 along with the copy of the protection agent 133. The management service 113 then waits for the protection agent 133 to contact it after installation.

Referring next to step 409, the management service 113 can respond to the request for security credentials. For example, the management service 113 can provide the management service authentication credentials 129 to the protection agent 133.

Proceeding next to step 413, the management service 113 can compare the information provided by the protection agent 133 to the information previously provided in the check-in message sent from the management agent 156. If the appropriate information included in the check-in messages match, then the management service 113 can determine that the protection agent 133 provided to the client device 106 has been installed and that the protection agent 133 is finishing the enrollment process. Accordingly, the management service 113 sets the enrollment status 139 of the client device 106 to "enrolled," "registered," or a similar status.

Moving on to step 416, the management service 113 can send the appropriate device policies 143 and user policies 149 to the client device 106. In some instances, the device policies 143 and user policies 149 can be separately sent to the protection agent 133 and the management agent 156. In other instances, the device policies 143 can be sent to either the protection agent 133, which then provides copies of the device policies 143 and user policies 149 to the management agent 156.

Figure 5:
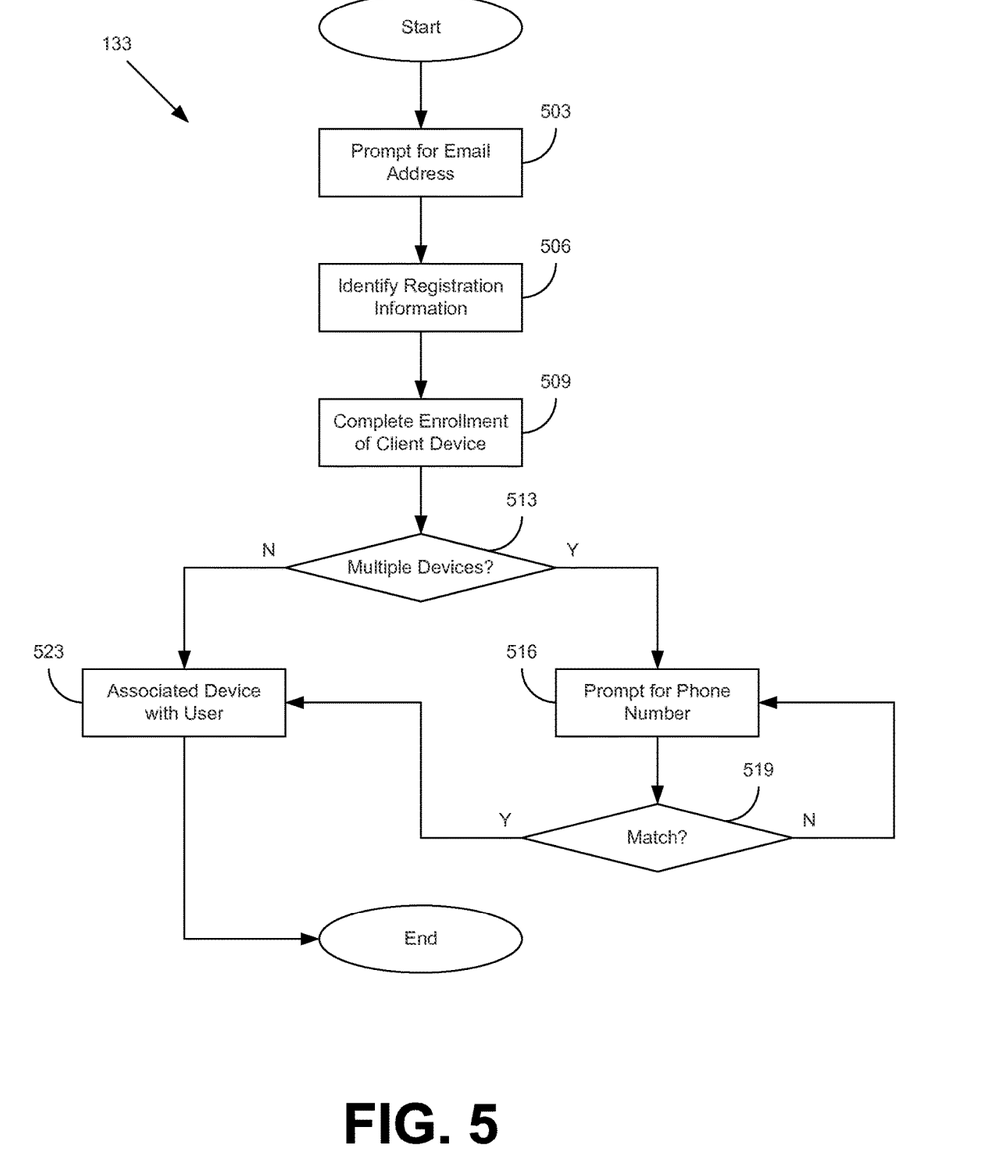
FIG. 5 is a flowchart depicting the operation of an application.

Referring next to FIG. 5, shown is a flowchart that provides another example of the operation of another portion of the management agent 156. As an alternative, the flowchart of FIG. 5 can be viewed as depicting an example of elements of a method implemented in the networked environment of FIG. 1.

Beginning with step 503, the management agent 156 can generate a user interface that prompts a user to input an email address. The email address can be collected in order to automatically determine user or device details, as further discussed below.

Moving on to step 506, the management agent 156 can identify registration information necessary to complete enrollment of the client device 106 with the management service 113. For example, in a Microsoft Windows® or Active Directory® environment, the management agent 156 can identify a user name and a domain name from the email address. For example, given the email address "john.doe@example.com," the management agent 156 can determine that the user name is "john.doe" and the domain is "example.com." In other instances, the management agent 156 can query a directory service to provide the username and domain for the email address "john.doe@example.com." Once the management agent 156 has identified the domain name and user name, the management agent 156 can query the domain controller or directory service for the domain to identify management service 113 for the domain.

If the automatic determination of the additional registration information fails, the management agent 156 can generate additional prompts to acquire the necessary information. For example, if client device 106 is being registered in a non-Microsoft environment or if the domain controller for the Active Directory is unresponsive, the management agent 156 can generate additional user interfaces to prompt the user to input their user name, the domain name, the uniform resource locator (URL) for the management service 113, and similar information.

Referring next to step 509, the management agent 156 can complete enrollment of the client device. As part of the enrollment process, the management agent 156 can present the user with one or more screens that authenticate the user and provide the necessary enrollment information. The management agent 156 can, for example, provide different screens based on the operating system of the client device (e.g. present one interface if the client is executing Windows 7 and another if the client is executing Windows 8.1 or later).

Proceeding next to step 513, management agent 156 can determine whether multiple devices have been registered to the user. For example, a user can have attempted to register or enroll two different client devices 106 (e.g. a tablet and a smartphone) or can be reregistering or reenrolling the client device 106 after it had been previously unenrolled. For example, the management agent 156 can query the management service 113 to identify the client devices 106, if any, that have been previously enrolled for the user. It the user has one or more client devices 106 already enrolled, then the process proceeds to step 516. Otherwise, the process skips to step 523.

Moving on to step 516, the management agent 156 can prompt the user to enter a phone number to be associated with the client device 106 to be registered. A subscriber identity module (SIM) card can have an associated phone number. This associated phone number can be used to uniquely identify a client device 106 which has the SIM card installed. As such, prompting a user to enter a phone number for a client device can serve to differentiate between device records 123.

Referring next to step 519, the management agent 156 can determine whether the phone number provided by the user matches the phone number associated with an existing device record 123. Should the phone number match the phone number associated with the existing device record 123, then the process proceeds to step 523. Otherwise, the process loops back to step 516 until the user enters a phone number that matches a device record 123.

Proceeding next to step 523, the management agent 156 can cause the management service 113 to associate the client device 106 with the user account. For example, the management agent 156 can include device identifier 136 and a user identifier 146 in an enrollment message, which the management service 113 can use to add the client device 106 to the list of linked devices 153 for the user. At this point, the process ends.

Figure 6A:
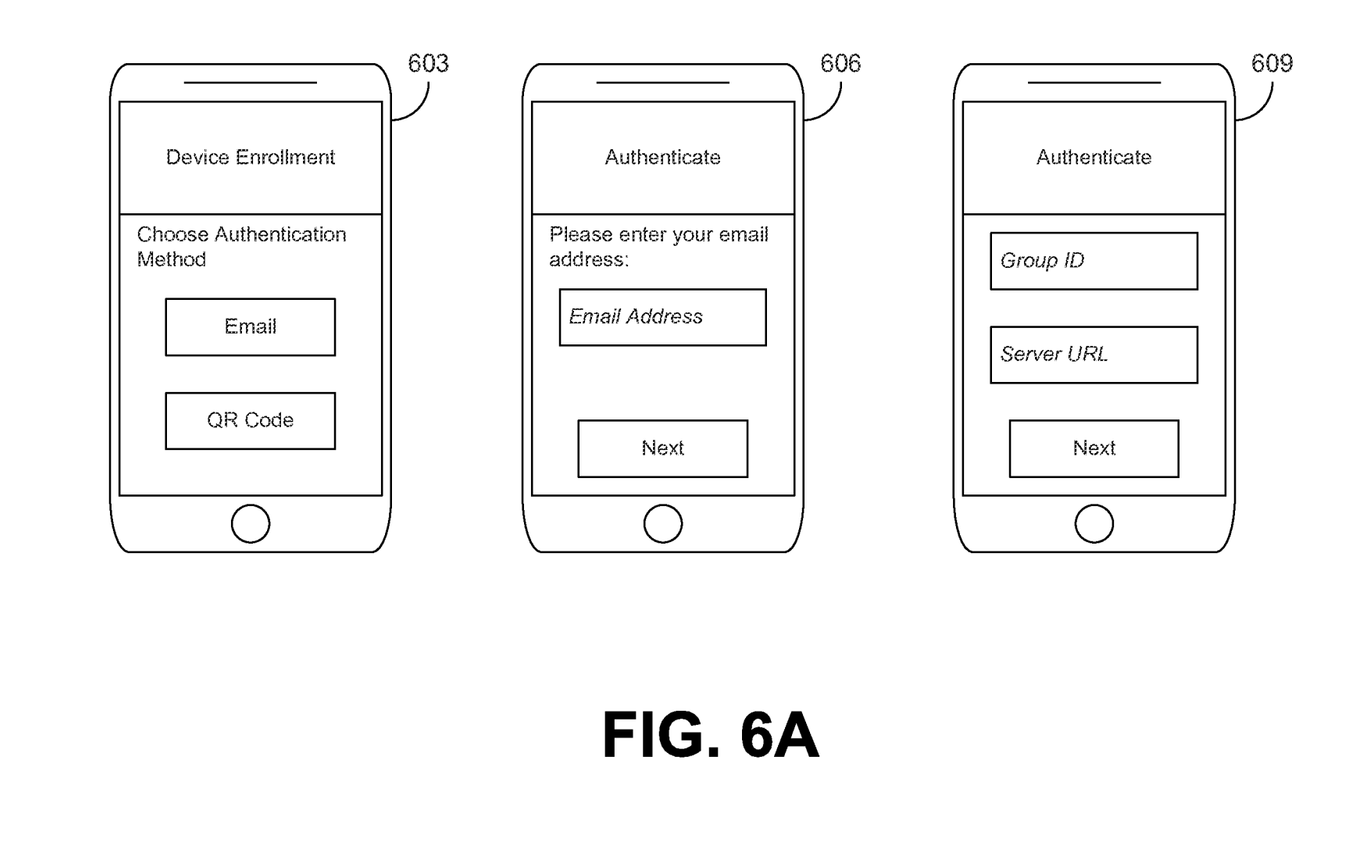
FIGS. 6A-D are user interface diagrams depicting user interfaces rendered by an application.

Moving on to FIG. 6A, shown is a series of user interface diagrams depicting the progression of the user interface rendered by the management agent 156 as a device is enrolled with the management service 113 as depicted in FIG. 5.

Beginning with user interface 603, the management agent 156 presents a prompt to the user that provides multiple options by which a user can enroll or otherwise register the client device 106 with a management service 113. For example, the user interface 603 can present the user with an option to enroll using an email address, scanning a bar code, such as a quick response (QR) code, or other option.

The management agent 156 can then present a subsequent user interface 606 prompting the user to enter an email address. As previously discussed, the user's email address can be used to automatically determine most of the information necessary to enroll the user's device. However, in some instances, the management agent 156 can be unable to identify certain parameters, such as the identifier of the group or groups that the user belongs to or the URL of the management service 113 with which the user is attempting to enroll a client device 106. In these instances, the management agent 156 can, as a failsafe or fallback option, generate a user interface 609 that prompts the user to enter a group identifier or a URL for the management service 113.

Figure 6B:
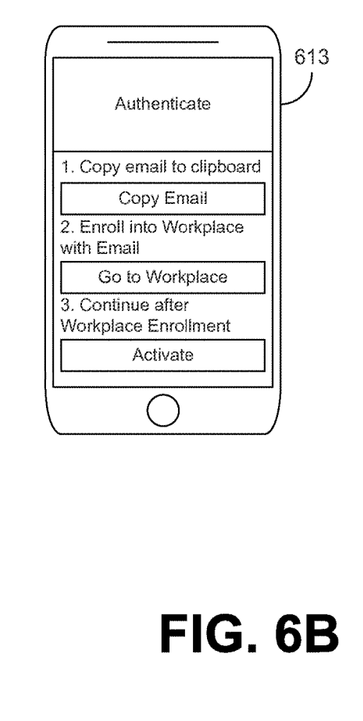

Moving on to FIG. 6B, shown is a series of user interface diagram depicting a user interface rendered by the management agent 156 as a device is enrolled with the management service 113 as depicted in FIG. 5.

The management agent 156 can generate a user interface that allows a user to configure the management agent 156 in order to complete enrollment with the management service 113. The user interface presented can, for example, be dependent on the operating system of the client device 106 because the management agent 156 can take advantage of certain operating system functions to simplify the enrollment process when possible.

For example, a user interface 613 can be rendered when the operating system of the client device 106 is equivalent or greater than version 8.1 of Microsoft Windows®. The user interface 613 can prompt a user to copy his or her email to the device clipboard, go to an external Workplace Enrollment screen provided by Windows 8.1 or higher, and then continue the enrollment process after the user has finished interacting with the Workplace Enrollment screen. This can allow Windows 8.1 devices to enroll with the management service 113 using an interface provided by the operating system that automatically determines user information (e.g. account name, domain name, and other user information) that can be used to enroll the user device. Accordingly, a user can avoid having to manually enter account information and server settings they may be unfamiliar with or unaware of.

Figure 6C:
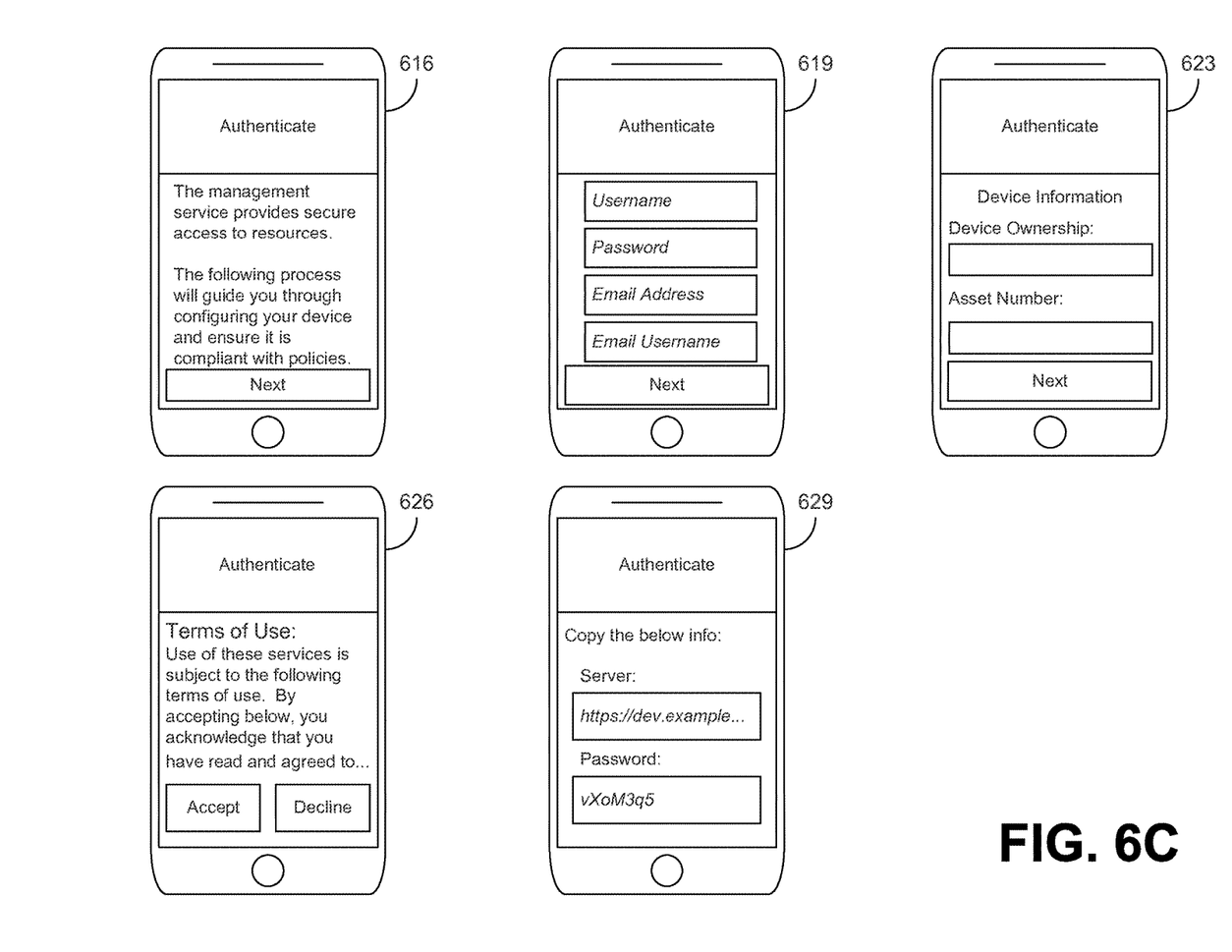

Moving on to FIG. 6C, shown is a series of user interface diagrams depicting the progression of the user interface rendered by the management agent 156 as a device is enrolled with the management service 113 as depicted in FIG. 5.

The management agent 156 can generate a user interface that allows a user to configure the management agent 156 in order to complete enrollment with the management service 113. The user interface presented can, for example, be dependent on the operating system of the client device 106 because the management agent 156 can take advantage of certain operating system functions to simplify the enrollment process when possible.

For example, a user interface 613 can be rendered when the operating system of the client device 106 is equivalent to or less than version 7 of Microsoft Windows. The management agent 156 can generate a user interface 616 that explains the purpose of the subsequently presented user interfaces.

The management agent 156 can then present a user interface 619 that requests a user to enter his or her username, password, email address, and email username. In some instances, one or more of these fields (e.g. username or email address) can be prepopulated using previously collected information.

Subsequently, the management application 156 can generate a user interface 623 that prompts a user to enter information about the ownership of the client device 106. For example, the user can be prompted to identify the device owner, an asset tracking number for the client device 106, and potentially other information.

The management application 156 can then generate a user interface 626 that displays the terms of use of the management service 113. The terms of use can include the permissible uses of the client device 106 when enrolled with the management service 113, and potentially other terms. The user can be prompted to accept or decline the terms of use. In some instances, the user can be required to scroll through the terms of use before presented with option to accept or decline.

Assuming that the user has accepted the terms of use, the user can be presented with a user interface 629 that displays the URL of the management service 113 and a password for connecting to the management service 113. In some instances, the user interface 629 can also include instructions regarding where to enter the server URL and password.

Figure 6D:
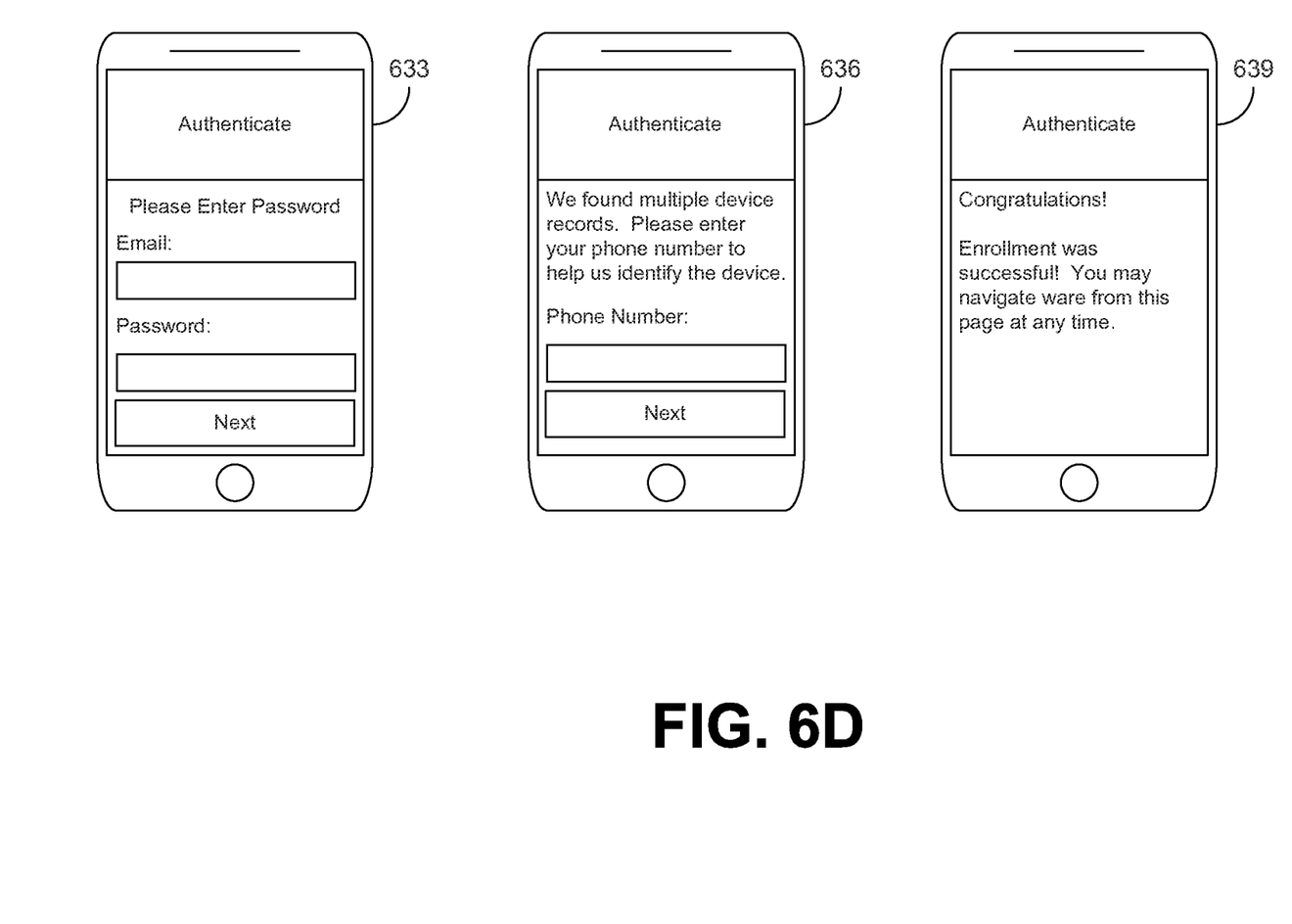

Moving on to FIG. 6D, shown is a series of user interface diagrams depicting the progression of the user interface rendered by the management agent 156 as a device is enrolled with the management service 113 as depicted in FIG. 5.

To complete enrollment of the client device 106 with the management service 113, the management agent can generate a user interface 633 that requests the email address of the user and the password for the management service 113, such as the password displayed in a previous user interface 629. If multiple or duplicate device records 123 for the user are found, the management agent 156 can generate a user interface 636 that asks for a user to enter a phone number associated with the client device 106. Once authentication is successful, a confirmation message can be displayed in a final user interface 639.

The sequence diagram of FIG. 2 and the flowcharts of FIGS. 3, 4, and 5 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagram of FIG. 2 and flowcharts of FIGS. 3-5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages can be added to the logical flow described herein, for purposes of enhanced utility, accounting, performance measurement, or troubleshooting aid. It is understood that all of these variations are within the scope of the present disclosure.

The computing environment 103 and the client device 106 or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The computing environment 103, the client device 106, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for native enrollment of mobile devices, comprising:
a computing device comprising a processor and a memory;
a management service comprising machine-readable instructions stored in the memory that, when executed by the processor, cause the computing device to at least:
receive a first message from a management agent executing on a client device, wherein the first message comprises an enrollment request for the client device;
send a protection agent to the client device in response to receipt of the enrollment request, wherein the protection agent is to be installed on the client device and the protection agent monitors for and prevents attempts to remove or modify the management agent;
receive a second message from the protection agent executing on the client device, wherein the second message comprises an authentication request;
provide authentication credentials to the protection agent executing on the client device in response to the second message;
receive a third message from the protection agent executing on the client device, wherein the third message comprises an enrollment confirmation for the client device;
change an enrollment status of the client device; and
send to the protection agent executing on the client device a policy assigned to the client device, the policy specifying a configuration option of the client device to be enforced during operation of the client device.

2. The system of claim 1, wherein the management service further causes the computing device to at least send a one-time authentication (OTA) token to the client device along with the third application.

3. The system of claim 1, wherein the management service further causes the computing device to at least:
identify a user account included in the enrollment request from the client device;
send a request for a phone number to the client device;
receive the phone number from the client device; and
identify whether the client device has been previously enrolled based on the phone number.

4. The system of claim 1, wherein the management service further causes the computing device to at least add a device record for the client device to a list of linked devices in a user account associated with a user of the client device.

5. The system of claim 1, wherein the enrollment status is changed from a pending status to an enrolled status.

6. The system of claim 1, wherein the first message complies with a version of the Open Mobile Alliance Device Management (OMA-DM) protocol.

7. The system of claim 1, wherein the authentication credentials comprise a hash-based message authentication code (HMAC) token.

8. A method, comprising:
receiving a first message from a management agent executing on a client device, wherein the first message comprises an enrollment request for the client device;
sending a protection agent to the client device in response to receipt of the enrollment request, wherein the protection agent is to be installed on the client device and the protection agent monitors for and prevents attempts to remove or modify the management agent;
receiving a second message from the protection agent executing on the client device, wherein the second message comprises an authentication request;
providing authentication credentials to the protection agent executing on the client device in response to receiving the second message;
receiving a third message from the protection agent executing on the client device, wherein the third message comprises an enrollment confirmation for the client device;
changing an enrollment status of the client device; and
sending to the protection agent executing on the client device a policy assigned to the client device, the policy specifying a configuration option of the client device to be enforced during operation of the client device.

9. The method of claim 8, further comprising sending a one-time authentication (OTA) token to the client device along with the protection agent.

10. The method of claim 8, further comprising:
identifying a user account included in the enrollment request from the client device;
sending a request for a phone number to the client device;
receiving the phone number from the client device; and
identifying whether the client device has been previously enrolled based on the phone number.

11. The method of claim 8, further comprising adding a device record for the client device to a list of linked devices in a user account associated with a user of the client device.

12. The method of claim 8, wherein the enrollment status is changed from a pending status to an enrolled status.

13. The method of claim 8, wherein the first message complies with a version of the Open Mobile Alliance Device Management (OMA-DM) protocol.

14. The method of claim 8, wherein the authentication credentials comprise a hash-based message authentication code (HMAC) token.

15. A non-transitory computer readable medium comprising machine readable instructions that, when executed by a processor of a computing device, cause the computing device to at least:
receive a first message from a management agent executing on a client device, wherein the first message comprises an enrollment request for the client device;
send a protection agent to the client device in response to receipt of the enrollment request, wherein the protection agent is to be installed on the client device and the protection agent monitors for and prevents attempts to remove or modify the management agent;
receive a second message from the protection agent executing on the client device, wherein the second message comprises an authentication request;
provide authentication credentials to the protection agent executing on the client device in response to receipt of the second message;

receive a third message from the protection agent executing on the client device, wherein the third message comprises an enrollment confirmation for the client device;

change an enrollment status of the client device; and send to the protection agent executing on the client device a policy assigned to the client device, the policy specifying a configuration option of the client device to be enforced during operation of the client device.

16. The non-transitory computer readable medium of claim 15, wherein the machine readable instructions further cause the computing device to at least send a one-time authentication (OTA) token to the client device along with the protection agent.

17. The non-transitory computer readable medium of claim 15, wherein the machine readable instructions further cause the computing device to at least:

identify a user account included in the enrollment request from the client device;

send a request for a phone number to the client device;

receive the phone number from the client device; and identify whether the client device has been previously enrolled based on the phone number.

18. The non-transitory computer readable medium of claim 15, wherein the enrollment status is changed from a pending status to an enrolled status.

19. The non-transitory computer readable medium of claim 15, wherein the first message complies with a version of the Open Mobile Alliance Device Management (OMA-DM) protocol.

20. The non-transitory computer readable medium of claim 15, wherein the authentication credentials comprise a hash-based message authentication code (HMAC) token.

* * * * *